United States Patent Office 3,069,399
Patented Dec. 18, 1962

3,069,399
COPOLYMERS OF STYRENE, VINYLBENZYL ALCOHOL AND ALLYL ALCOHOL
John G. Abramo and Earl C. Chapin, Springfield, Mass., assignors to Monsanto Chemical Company, St. Louis, Mo., a corporation of Delaware
No Drawing. Filed Mar. 25, 1960, Ser. No. 17,454
3 Claims. (Cl. 260—80.5)

The present invention is directed to synthetic copolymers and more particularly to styrene-vinylbenzyl alcohol-allyl alcohol copolymers.

Styrene-allyl alcohol copolymers which have been esterified with drying oil fatty acids such as those from linseed oil, dehydrated castor oil, soybean oil etc. have found extensive use in varnish-type surface coating applications. However, these copolymers have been found less than completely successful in the said applications in that it is difficult to achieve a satisfactory level of hydroxyl content and specific viscosity together with compositional homogeneity. In this regard, the specific viscosity of the copolymers themselves, in order to be acceptable in varnish applications, should range about 0.5–10.0 as determined on a solution of 10 parts of copolymer in 100 parts of dimethyl formamide at 25° C. using an Ostwald viscometer. By contrast, styrene-vinyl-benzyl alcohol copolymers, while possessing all of these qualifications, give copolymers having viscosities above those desired for surface coating application.

Accordingly, it is a principal object of this invention to provide synthetic copolymers which are capable of being esterified with drying oil fatty acids to provide varnish-type surface coatings.

Another object is that of providing the said copolymers which are capable of assuming high hydroxyl content, up to 15%, and specific viscosities recommending usage in surface coating applications.

Other objects of the invention will in part be obvious and will in part appear hereinafter.

These and other objects of the invention can be attained in synthetic copolymers comprising in interpolymerized form (a) styrene, (b) vinylbenzyl alcohol having the structure:

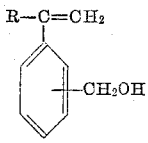

wherein R is selected from the class consisting of hydrogen and methyl radicals, and (c) allyl alcohol.

The following examples are given in illustration of the invention. Where parts are mentioned, parts by weight are intended unless otherwise specified.

Example I

A solution constituting 20 grams styrene, 20 grams p-vinylbenzyl alcohol, 40 grams allyl alcohol and 1.6 grams ditertiary-butyl peroxide is heated in 8 mm. glass tubes under inert atmosphere at 140° C. for 3 hours. The reaction product obtained is a clear, colorless, viscous syrup. The polymer is then recovered as a clear, colorless, brittle solid by evaporating unreacted monomers from the syrup under vacuum of 0.1 mm. Hg up to a temperature of 200° C. The product, 42.5 grams, contains 7.8% hydroxyl content, a specific viscosity of 2.7 (10 grams dissolved in 100 ml. of dimethyl formamide) using an Ostwald viscometer, and is determined to contain 47.6% styrene, 47.6% p-vinylbenzyl alcohol, and 4.8% allyl alcohol. The product softens at about 130° C. and is soluble in dimethyl formamide, acetone and mixtures of methanol-benzene.

Example II

Twelve grams of soya bean fatty acid anhydride are blended into a solution constituting 10 grams of the polymer from Example I dissolved in 60 ml. of pyridine. The mixture is heated on a steam bath for two hours after which water is added causing the now esterified copolymer to become precipitated. The esterified copolymer is then removed in the form of a soft viscous product which is dried in a vacuum of 0.1 mm. Hg at room temperature and dissolved in sufficient toluene to give a 50% solids varnish solution. The varnish solution is clear, slightly tan in color and is shown to be essentially completely esterified copolymer (terpolymer of Example I) by infrared analysis.

The varnish solution prepared above is mixed with a trace of cobalt naphthenate as a dryer and cast as a film, 3 mil thickness, on a 10 mil steel-tin plate. The film loses its tackiness in about 20 minutes. On drying in a circulating air oven at 150° C. for 15 minutes a tough, glossy film is obtained which shows excellent adhesion to the metal plate. The cured film is not attacked by dilute sodium hydroxide or xylene-butanol mixtures.

Example III

The procedure of Example I is again repeated using 20 grams of p-isopropenylbenzyl alcohol in place of the p-vinylbenzyl alcohol used there. The copolymer product obtained is esterified with linseed oil fatty acids and dissolved in toluene to provide a useful varnish product.

The copolymers of the present invention comprise in copolymerized or interpolymerized form (a) styrene, (b) vinylbenzyl alcohol having the structure:

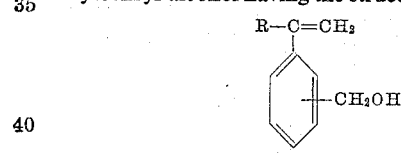

wherein R is selected from the class consisting of hydrogen and methyl radical and (c) allyl alcohol.

The styrenes which can be used as monomeric components in producing the copolymers of the present invention include styrene and alpha-methylstyrene, o-, m- and p-methylstyrene, o-, m- and p-chlorostyrene, etc. and mixtures of the same.

The vinylbenzyl alcohols which can be used as monomeric components include those having the structure:

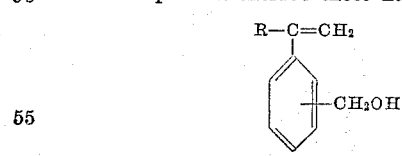

wherein R is selected from the class consisting of hydrogen and methyl radicals. More particularly, the vinylbenzyl alcohols include the o-vinylbenzyl alcohol, m-vinylbenzyl alcohol and the p-vinylbenzyl alcohol when R represents hydrogen; and when R represents a methyl radical the o-isopropenylbenzyl alcohol, m-isopropenylbenzyl alcohol and the p-isopropenylbenzyl alcohol are representative. Various simple substituents such as the halogens and alkyl radicals can also be accommodated on the phenyl radical, to provide vinylbenzyl alcohols intended to be included here. The subject vinylbenzyl alcohols can be produced in the manner set forth in copending application Serial No. 747,828, filed July 11, 1958, in the name of John G. Abramo. Mixtures of these vinylbenzyl alcohols can also be used.

The allyl alcohols to be used as monomers include allyl alcohol, methallyl alcohol, phenallyl alcohol, etc., and mixtures of the same.

Copolymers exhibiting desirable properties are those containing in copolymerized form 20 to 88 weight percent of styrene, 80 to 10 weight percent of vinylbenzyl alcohol and 30 to 2 weight percent of allyl alcohol. More preferably they contain in polymerized form 40–75 weight percent of styrene, 50–20 weight percent of vinylbenzyl alcohol and 20–5 weight percent of allyl alcohol.

Accordingly then, those copolymers containing about 1.0–15 hydroxyl content as determined on a weight basis exhibit desirable properties, while those containing about 4–10% are the more preferred.

The copolymers of the present invention can be prepared using mass or solution polymerization techniques operated in a batch or continuous manner.

In the mass and solution polymerizations, a monomeric mixture is prepared of from 10 to 60 parts by weight of styrene, 60 to 10 parts by weight of vinylbenzyl alcohol and 80 to 10 parts by weight of allyl alcohol, parts by weight being determined on the weight of the total monomers. The monomer mixture is subjected to heating at about 80 to 200° C. under at least autogenous pressure until the monomers become copolymerized or interpolymerized. Copolymerization can be thermally initiated but it is preferred to employ a small quantity of a free radical polymerization initiator such as for example hydrogen peroxide, tertiarybutyl perbenzoate, pinacolone peroxide, ditertiarybutyl hydroperoxide, azo-bisisobutyronitrile, etc. The amount of such initiator employed will generally fall within the range of about 0.05 to 5.0 parts by weight per 100 parts of total monomers. This may, however, be varied.

The solvents suitable for use in the solution type of polymerization are organic liquids which are inert to the reaction, e.g., toluene, xylene, benzene, dioxane, etc.

The synthetic copolymers of the present invention are clear and essentially colorless materials which can be used in the form obtained from being polymerized in the manner set forth previously to provide useful films, coatings and other applications. Of more interest, however, is the application of these copolymers as varnish-type surface coatings. This latter can be exercised by first partly esterifying certain of the copolymers obtained, i.e., those exhibiting specific viscosities as defined previously, with drying oil fatty acids such as those from linseed oil, tung oil, coconut oil, soybean oil, dehydrated castor oil, oiticica oil, perilla oil, safflower oil, etc. The hydroxyl groups contained in the backbone of the copolymers serve as sites for the esterification to take place between the copolymers and the drying oils. The partly esterified copolymer can then be solvated in an organic solvent such as toluene, xylene, butanol, xylene-butanol mixtures, etc., and applied to the article, substrate or other support member which is to be provided with a varnish surface coating or finish. Coincidentally the varnish solution can be provided with driers, catalysts, fillers, colorants, etc. as desired. After curing or drying and curing at elevated temperature, or otherwise coalescing the varnish eventuates as by catalysis etc., to advance esterification, a tough, glossy continuous film or finish is obtained which exhibits excellent adhesion with the surface applied to, even when the latter is metallic in nature. In addition, the cured film resists attack by the usual organic solvents.

It will thus be seen that the objects set forth above among those made apparent from the preceding description are efficiently attained and since certain changes may be made in carrying out the above process and in the polymer products which result without departing from the scope of the invention, it is intended that all matter contained in the above description shall be interpreted as illustrative and not in a limiting sense.

What is claimed is:

1. Copolymers comprising copolymerized (a) 20–88 weight percent of styrene, (b) 80–10 weight percent of vinylbenzyl alcohol having the structure:

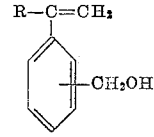

wherein R is selected from the class consisting of hydrogen and methyl radical, and (c) 30–2 weight percent of allyl alcohol; the combined proportions of components (a), (b) and (c) totaling 100 weight percent; all of said percentages by weight being based upon the total weight of copolymers.

2. The copolymers according to claim 1 wherein the vinylbenzyl alcohol is p-vinylbenzyl alcohol.

3. The copolymers according to claim 1 wherein the vinylbenzyl alcohol is p-isopropenylbenzyl alcohol.

References Cited in the file of this patent
UNITED STATES PATENTS

| | | |
|---|---|---|
| 2,441,515 | Snyder | May 11, 1948 |
| 2,534,193 | Emerson | Dec. 12, 1950 |
| 2,839,514 | Shokal | June 17, 1958 |